(No Model.)
H. NORTHWOOD.
MOLD FOR ORNAMENTAL GLASS MANUFACTURE.
No. 431,388. Patented July 1, 1890.
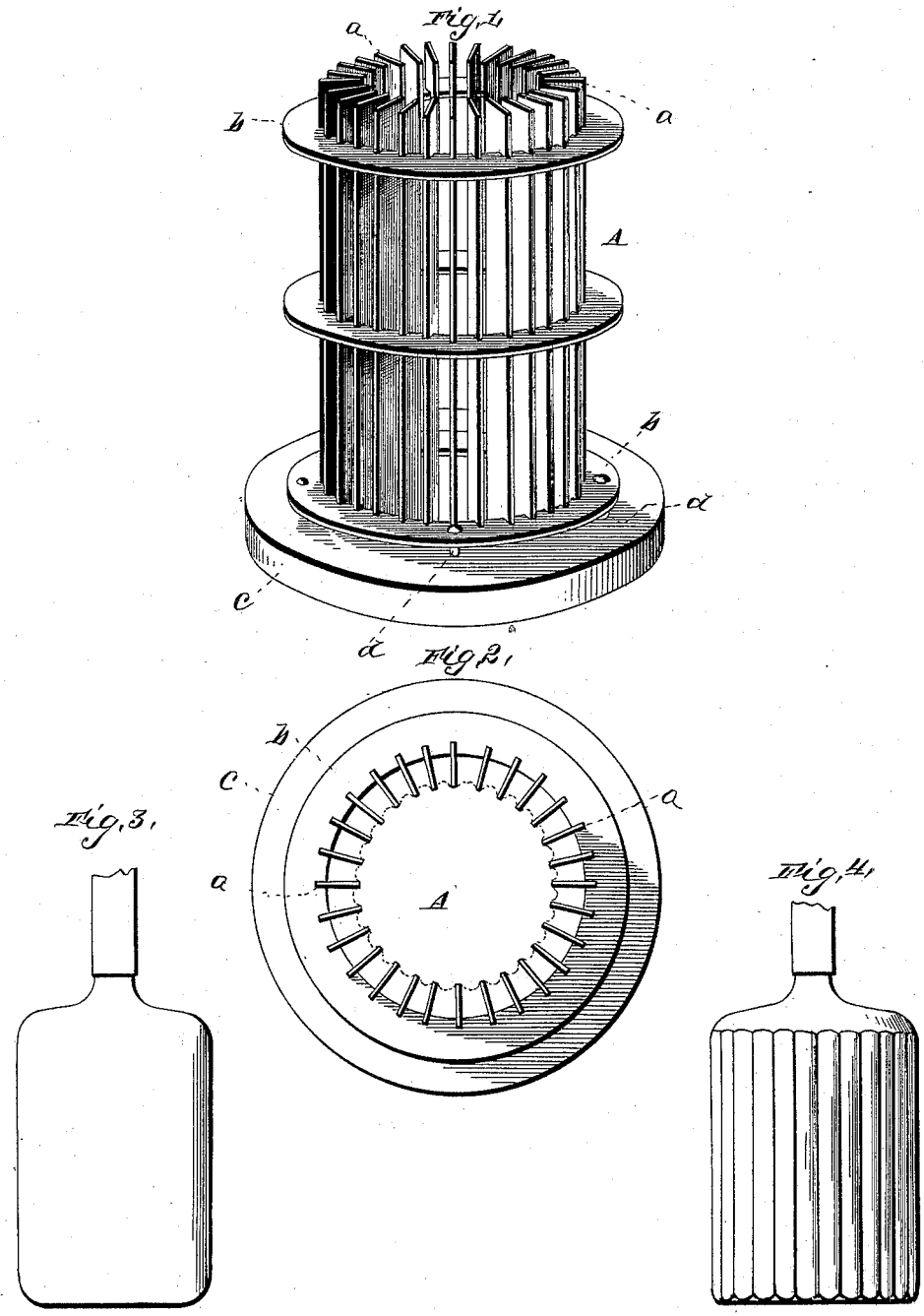
WITNESSES
INVENTOR
Harry Northwood
by E. W. Anderson
his Attorney

UNITED STATES PATENT OFFICE.

HARRY NORTHWOOD, OF MARTIN'S FERRY, OHIO.

MOLD FOR ORNAMENTAL GLASS MANUFACTURE.

SPECIFICATION forming part of Letters Patent No. 431,388, dated July 1, 1890.

Application filed February 26, 1890. Serial No. 341,871. (No model.)

*To all whom it may concern:*

Be it known that I, HARRY NORTHWOOD, a citizen of the United States, and a resident of Martin's Ferry, in the county of Belmont and State of Ohio, have invented certain new and useful Improvements in Molds for Ornamental Glass Manufacture; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view. Fig. 2 is a top plan view. Figs. 3 and 4 are views of the article produced by the mold.

This invention has relation to certain improvements in molds for the manufacture of glassware, and has for its object the provision of means for shaping, molding, or treating the wall or body of the article being formed from a blown or molded glass cylinder in such a manner that only a minimum portion of the surface thereof shall have contact with the iron or metal of the mold, thereby preserving the natural polish and beautiful brilliancy which contact with metal to the extent it has hereto had would partially destroy.

My invention consists of the novel construction and combination of parts, as will hereinafter be described, shown, and claimed.

In the embodiment of my invention I provide a mold A, which is constructed of a number of circularly-arranged vertical blades or plates *a a*, a number of rings or bands *b b*, and a base *c*, to which the bottom ring is bolted, as at *d d*. The blades or plates, which may be of iron, steel, brass, copper, or other suitable material, are let into and secured to the rings *b* edgewise and at suitable intervals apart, thus having the outline of a cylinder. It will be seen that the workman has at the end of his blow-pipe a cylindric piece of glass heated until pliable, and by placing said piece into the center of the mold or cylinder A and expanding the glass piece by blowing into the pipe until the glass is caused to enter the spaces between the blades or plates of said mold the glass pieces will have the scalloped cylindric body, as disclosed in Fig. 4. The glass piece is now withdrawn from the mold and manipulated into the desired shape by means of any of the well-known methods. From this arrangement it will be noticed that simply the edges of the blades or plates of the mold are presented to the glass. Consequently only a minimum portion of the surface of the glass is in contact with the metal of the mold, and this surface is confined to the depressions of the scallops; hence the glass is blown and molded virtually without contact with the metal, thereby preserving the natural polish and brilliancy of the glass, which contact with metal to the extent it has heretofore had—viz., wholly enveloped by the mold—would partially destroy.

Having described this invention, what I claim, and desire to secure by Letters Patent, is—

The mold or cylinder for making glass articles, consisting of a number of circularly-arranged, edgewise-disposed, and spaced-apart blades or plates, a number of rings or bands receiving and encompassing said blades or plates, and a base to which the bottom ring or band is bolted or secured, substantially as specified.

In testimony whereof I affix my signature in presence of two witnesses.

HARRY NORTHWOOD.

Witnesses:
EDW. L. ROSE,
HENRY E. RICH.